United States Patent [19]

Tesar

[11] Patent Number: 4,505,166
[45] Date of Patent: Mar. 19, 1985

[54] CONTROL-IN-THE-SMALL SYSTEM FOR PRECISION, UNDER LOAD CONTROL OF ROBOT MANIPULATOR

[75] Inventor: Delbert Tesar, Gainsville, Fla.

[73] Assignee: University of Florida, Gainesville, Fla.

[21] Appl. No.: 363,457

[22] Filed: Mar. 30, 1982

[51] Int. Cl.³ .................. B25J 3/04; G05G 11/00
[52] U.S. Cl. ........................... 74/479; 74/469; 74/522; 74/571 M; 403/91; 403/103; 414/4; 414/730; 414/786; 901/23; 901/24
[58] Field of Search ........... 74/469, 479, 522, 571 R, 74/571 M; 414/4, 5, 730, 786; 403/91, 92, 103; 901/9, 23, 24, 25, 26, 50

[56] References Cited

U.S. PATENT DOCUMENTS

| | | | |
|---|---|---|---|
| 130,878 | 8/1872 | Stiles | 74/522 X |
| 2,188,635 | 1/1940 | Dusen, Jr. | 74/522 X |
| 2,963,119 | 12/1960 | Rager et al. | 74/522 X |
| 3,241,687 | 3/1966 | Orloff | 414/5 |
| 3,849,668 | 11/1974 | Dane | 414/4 X |
| 4,235,567 | 11/1980 | Pilch | 74/522 X |

FOREIGN PATENT DOCUMENTS 31456  3/1977  Japan ................... 74/479

Primary Examiner—Allan D. Herrmann
Attorney, Agent, or Firm—Antonelli, Terry & Wands

[57] ABSTRACT

A remote manipulator for a robotic system has a plurality of intercoupled manipulator links and a principal manipulator drive unit coupled to manipulate the remote position of an end-effector supported by said links in response to a manipulator control signal. Coarse adjustment of the end effector is refined by a precision control subsystem which augments the principal manipulator to achieve a "control-in-the-small" robotic manipulator system. The augmenting precision-achieving subsystem includes a coupling mechanism, coupled with one of the links, for establishing the position of one of the links relative to another link, and a precision adjustment device, associated with the coupling mechanisms for adjusting the position of the one link relative to another link as established by the coupling mechanism, independently of the action of the principal manipulator drive unit and effectively without bearing the load supported by the one of said links. Generally, if the manipulator has N major degrees of freedom, then it will be useful to implement up to N secondary degrees of freedom to adequately establish the control-in-the-small subsystem.

22 Claims, 12 Drawing Figures

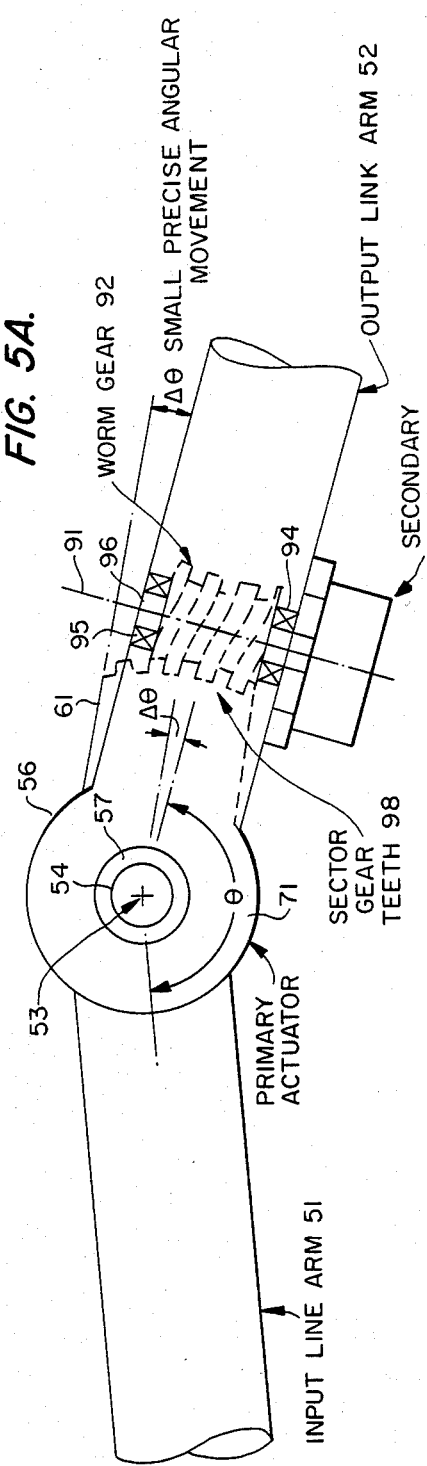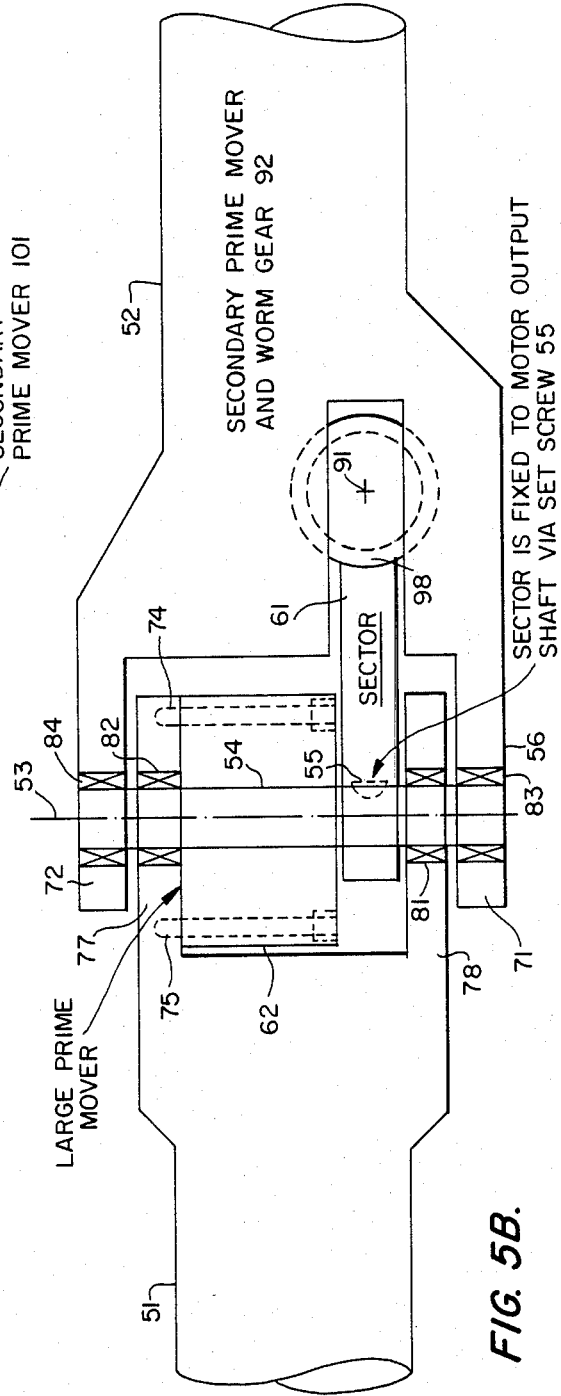

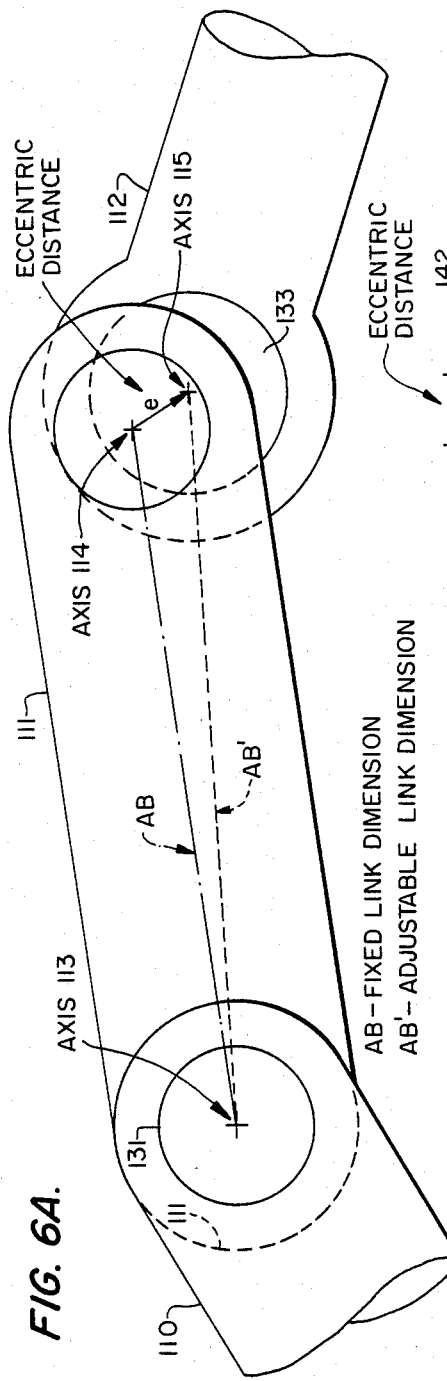
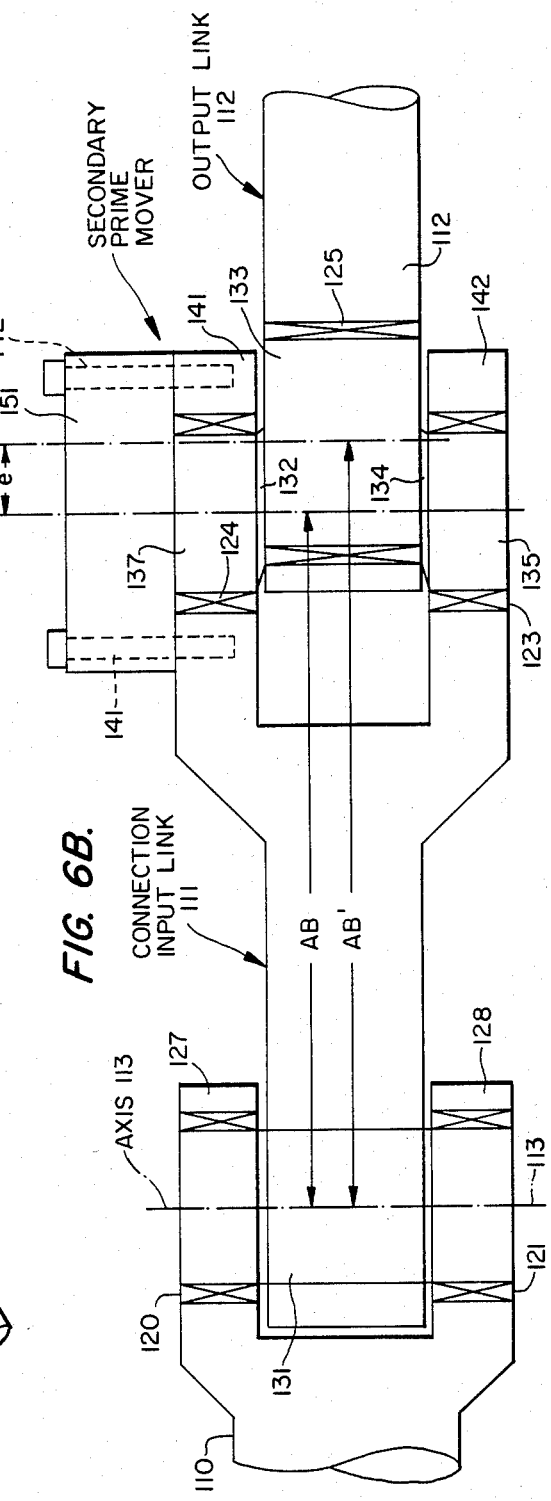

CONTROL-IN-THE-SMALL SYSTEM FOR PRECISION, UNDER LOAD CONTROL OF ROBOT MANIPULATOR

FIELD OF THE INVENTION

The present invention relates to robotic systems and is particularly directed to a system for providing precise control of a robotic manipulator under load conditions.

BACKGROUND OF THE INVENTION

Recent advancements in industrial and scientific control systems have witnessed a substantial increase in the use of computer-controlled robotic apparatus for the manipulation of workpieces, instruments, components, etc. in place of the human worker or operator. The present generation robot is essentially a mechanical manipulator (usually having six degrees of freedom of available displacement) driven by digital commands from a controlling processor. The closed loop information that is available to the processor usually consists of position and velocity encoder data at the manipulator joints and may also include either current levels at the electrical actuators or pressure levels at the hydraulic actuators. Unfortunately, this amount of information is insufficient to accurately describe the actual location of the end effector of the manipulator in space, such that closed-loop operation of the system has not yet been attainable. Moreover, almost all robots vibrate at a low frequency (from three to ten Hz) and when oscillated by means of human "hand shaking" will vibrate with an amplitude of $\frac{3}{8}''$ to $\frac{1}{2}''$. This indicates that the robot arm is not truly accurate under load, so that it cannot be expected to perform precision machining operations, make precision measurements during such operations (automatic inspection), or respond to an independent set of commands from a processor-supplied data base.

One example of the application of robotic systems to state-of-the-art precision machining tasks involves the use of jigs for supporting the manipulator structure. This approach has been employed in the aircraft industry where an expensive precision jig is used to guide a drill bit held by the robot in order to accurately drill hundreds of holes in a composite wing surface. In this system, which undesirably requires a complex and daily calibration, the robot system is used merely to automate the sequencing of the hole-to-hole drilling procedure and to preload the drill so that cutting action is ensured. As such, the robot makes no contribution to the precision hole location layout or its inspection. Moreover, the jig is essentially a barrier to flexible automation since its form is necessarily static, and thereby prevents any response to an arbitrary processor-supplied data base.

Another example of today's state-of-the art involves the precision routing of air frame surface panels that must be cut to $\pm 1/16''$ to $\pm 1/32''$ accuracy. These panels, which must have a large variety of three-dimensional shapes, are pre-cut oversize and formed in a press. The panels must then be cut to final specifications with a high speed router cutter. This is usually accomplished by placing the uncut panel in a jig which has precision surfaces on which concentric (with the router cutter) rollers can roll. Hence, again the robot only provides the preloading and sequencing of the motion of the precision cutter. It is not responsible for any of the accuracy requirements either during the process or during inspection.

One attempt to deal with the problem of drilling in special wing surfaces has been through the use of a special large X-Y-Z table provided with a drilling head developed by Grumman Aerospace. This machine provides the level of accuracy desired and is capable of responding to a broad range of commands. However, this specially configured (nongeneric) drilling table addresses only a special problem of interest. It does not deal with the basic shortcomings of current generation robots, namely the accuracy of positioning the end-effector under load conditions for a wide variety of industrial and scientific applications and configurations.

When analyzing the operations to be performed by a robotic system as a replacement for a human counterpart, it is extremely important to realize that the human system performs its function because of unsurpassed hand-eye coordination. Nonetheless, the human system is probably a very poor model for performing precision operations under load. This fact has not been widely recognized and to a great extent slows the scientific and industrial community's response to this valid need. Note that no human hand is capable of precision measurement or is capable of precision machining operations under load. Because this is true, the human model for robotic manipulators is adequate only for relatively simple repetitive tasks such as pack-and-place, spot welding, painting, surveillance, unloaded assembly, etc. A precision system capable of high loads in real-time operation that is unattainable by the human mode could perform such tasks as precision machining without jigs, precision inspection during operation, multi-level operations under CAD/CAM control, force fit assembly, etc.

Unfortunately, as pointed out above present day robots used in precision assembly are capable of only light loads and performing those tasks only under conditions which are repetitive and unchanging. One contradiction is that high load actuators provide very poor resolution and, vice versa, high resolution actuators provide very low load capacity. This fundamental contradiction appears to be unsolvable in terms of the present state-of-the-art.

An additional consideration is the fact that most manipulator arms are accurate to only about 0.050 inch, which is insufficient for many precision operations such as assembly operations and spatial motion functions (for example, laser cutting and welding operations). Precision requirements will intensify as robotic systems become smaller (micro-robotics) and are applied to such functions as micro-surgery. Generally, deformations under small applied loads in existing commercial systems substantially exceed the static (or repetitive) precision level they can achieve. In addition, the operating environment (temperature, loads, shocks, vibrations, etc.) cannot always be considered invariant, so that not only must the robotic system be capable of precise manipulation, with a narrowing range of tolerances, under load, but it must be adaptable to changing conditions.

SUMMARY OF THE INVENTION

In accordance with the present invention, there is provided a new and improved robotic system that is capable of providing a robotic manipulator with the ability to controllably position an end-effector with a high degree of precision not heretofore achieved when the manipulator mechanism is placed under a substantial load and yet is integratable with existing robotic systems so that it is substantially invisible to the outside world, thereby making it an especially attractive addition to developing state-of-the-art robot technology.

In achieving the needs of current and developing robotic systems, the present invention addresses two pressing problems confronting the industry. On the one hand, major actuators which are capable of accommodating substantial loads over large motion ranges are simultaneously incapable of meeting high resolution (the smallest increment of motion needed) requirements. On the other hand real-time control over large motion ranges can be accomplished adequately provided the computational sampling rate is modest. However, such limited system up-date rates makes the simultaneous maintenance of high precision operation unlikely.

Pursuant to the present invention, these needs are met by a robotic system that contains both a large (high load capacity) actuator and a small precision (non load bearing) actuator integrated together, to form a "control-in-the-small" robotic system. The dual operation of large and small control is achieved computationally by employing a slow speed sampling rate over the full, nonlinear, range of the large motion manipulator and a high speed sampling rate for the linearized small motion manipulator adjustment built into the structure. The small precision actuator is integrated physically with the large manipulator such that it permits the overall system to provide a highly precise positioning capability for the manipulated end-effector under substantial load conditions, while keeping the small motion system invisible to the outside world.

The mechanical configuration of the dual motion/control system may employ both angular and linear adjustment mechanisms. In an exemplary embodiment for achieving control-in-the-small angular adjustment, the present invention may comprise a worm gear drive disposed within and axially orthogonal to the longitudinal axis of an output link arm of a primary actuator. The primary actuator may form part of the joint between an input link arm and the output link arm, the axis of rotation of the primary actuator constituting the axis about which the output link arm is driven in rotation about the input link arm. The primary actuator may comprise a large torque output electric or hydraulic rotary drive unit whose drive shaft is coaxial with axis of rotation of the output link arm about the input link arm. Fixed to the drive shaft of the primary actuator is a sector gear whose teeth mesh with the worm gear driven by a secondary actuator drive unit, such as a small electric or hydraulic motor. This small secondary actuator is not responsible for bearing any loads, torsional stiffness, etc. of the overall system, its only force requirement being to transmit the torque at the joint. Since this small secondary unit imparts only a fine or vernier adjustment rotation to the load bearing arm links it can be configured in a very compact mechanism and may be considered to be effectively invisible to an outside viewer of the system.

In order to realize control-in-the-small linear adjustment, the present invention may include a fixed length connection link which joins together an input link arm and an output link arm. One end of the connecting link is supported for rotation about a reference axis passing through the input link arm. The other end of the connecting link contains an eccentric rotary drive element the axis of rotation of which is offset from or eccentric to the axis of rotation of a rotary support element disposed within the output link arm. A secondary drive unit for imparting small rotational drive torque to the eccentric rotary drive element may be incorporated as part of the connecting link or the output link arms, so as to be virtually hidden from the outside observer. As in the case of the rotary motion control-in-the-small drive unit, the eccentric secondary drive unit is effectively a non loaded component of the system. As in the case of the above-described embodiment of the invention for accomplishing control-in-the-small angular adjustment, the linear drive unit may include a compact non-load bearing worm gear drive unit incorporated in an output link arm which meshes with a gear sector element that is attached to a rotary eccentric contained within the fixed length connecting link. The axes of rotation of the rotary eccentric and the gear sector are offset from each other so that rotation of the worm gear causes a change in the overall length of the combination of the connecting link and output link arm.

Advantageously, these control-in-the-small robotic system embodiments of the present invention may be incorporated into a broad range of robotic manipulator systems including serial, parallel, or a combination of serial and parallel systems, thereby making it especially attractive for current and developing robotic manipulator devices.

BRIEF DESCRIPTION OF THE DRAWINGS

FIGS. 5A and 5B are respective side and top views of a control-in-the-small precision actuator for achieving precision angular adjustment in accordance with one embodiment of the present invention;

FIGS. 6A and 6B are respective side and top views of a control-in-the-small precision actuator for achieving precision linear adjustment in accordance with a second embodiment of the present invention;

DETAILED DESCRIPTION

As was described briefly above, the precision control-in-the-small robotic manipulator system according to the present invention may be incorporated in current and developing robotic manipulator systems, whether they employ serial arm structure, parallel manipulator structure, or a combination of serial and parallel components. While a detailed description of the manipulator link configurations in which the present invention may be incorporated is not necessary for an understanding of the present invention, various types of systems will be described in general terms in order to facilitate an appreciation of the advantageous simplicity of the invention and the manner in which it may be readily incorporated in any one of numerous configurations of robotic systems.

Figure 1:
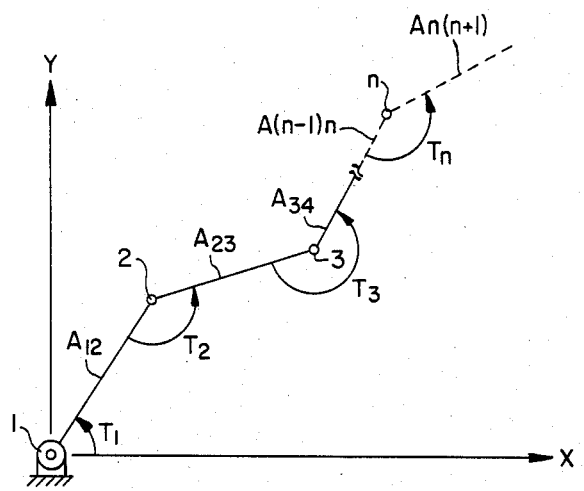
FIG. 1 is a schematic diagram of a simple serial arm structure that may be the bases for a robotic manipulator system.

FIG. 1 shows, in schematic diagram form, a simple serial arm structure made up of a plurality of serially connected links $A_{12}$, $A_{23}$, $A_{34}$, ... $A_{n(n+1)}$ which form consecutive interconnections for a plurality of joints 1, 2, 3, ... n. The illustration is shown in a simple two dimensional XY coordinate system with the base link 1 for the initial arm $A_{12}$ positioned at the origin. The serial nature of this system is due to the alternate sequence of links $A_{ij}$ and actuator driven joints 1, 2, ... n in the arm structure with successive measurable angles of rotation $T_1$, $T_2$, $T_3$, ... $T_n$ as shown. Nearly every existing robotic manipulator currently employed by science and industry contains such a serial arm structure and, to a great extent, the human arm itself is configured as a serial arm structure. Usually, the joint between neighboring links 1, 2, ... n is simply a rotational or sliding joint.

Figure 2:
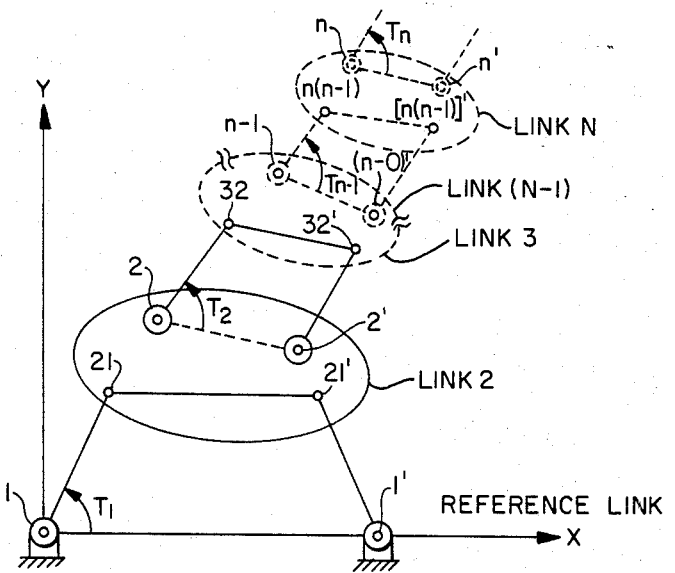
FIG. 2 is a schematic diagram of a generalized serial arm structure that may be the bases for a robotic manipulator system.

Serial arm structure may be considered from a more generalized standpoint in the configuration shown in FIG. 2 where each of the joints is comprised of a set of four link loops stemming from a pair of base pivot points 1 and 1' through successive pairs of pivot points, 2, 2', 3, 3' ... (n−1), (n−1)' and n, n'. Similar to the simple serial arm structure configuration shown in FIG. 1, the respective links 2, 3, ... n−1, n pivot about their respective base joints through sets of angles $T_1$, $T_2$, ... $T_{n-1}$, $T_n$. The configuration shown in FIG. 2 is more versatile than that in FIG. 1 and offers a considerable improvement in strength, dexterity and range of motion.

Figure 3:
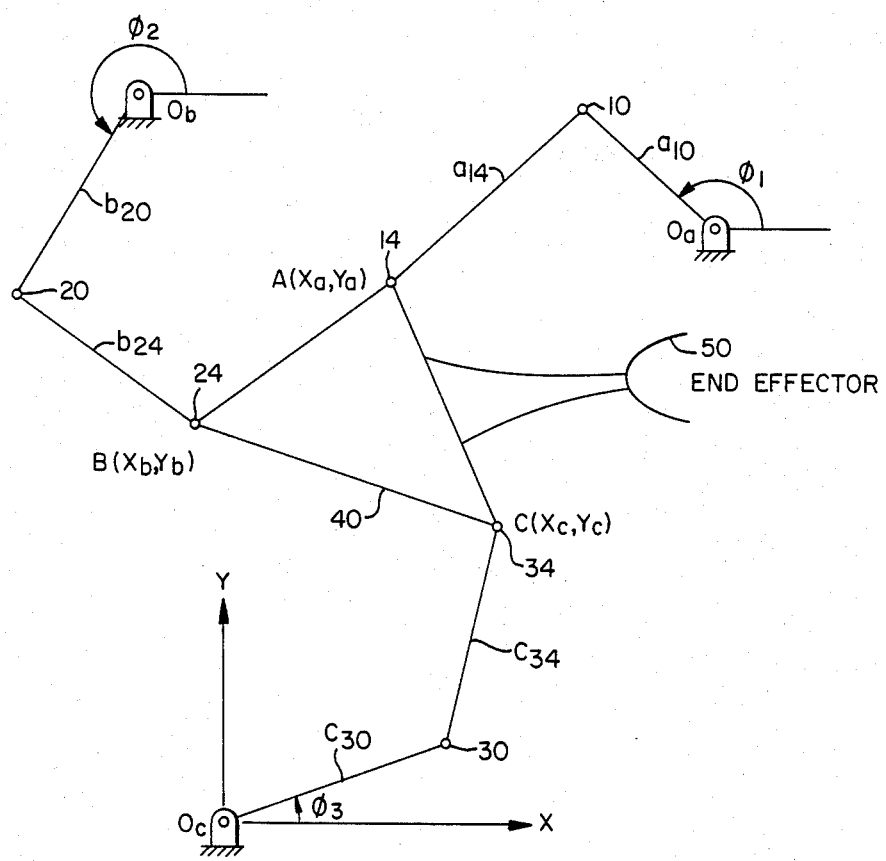
FIG. 3 is a schematic diagram of a planar parallel structure that may be the basis for a robotic manipulator system.

In addition to the serial arm structure shown in FIGS. 1 and 2, the robotic manipulator system may be configured as a parallel structure manipulator, a planar arrangement for which is shown in FIG. 3. The configuration shown in FIG. 3 is a schematic illustration of a robotic hand manipulator system, the hand or end effector 50 being attached to an element 40, here presented in triangular link having three joints 14, 24, and 34. Three degrees of movement or control are provided for the manipulator by way of rotational inputs at pivot support points $O_a$, $O_b$ and $O_c$, as shown. From pivot control point $O_a$, there extends an arm $a_{10}$ joined by joint 10 with a second arm $a_{14}$ to joint 14 of the triangular link member 40. Similarly, from support rotation control point $O_b$, an arm $b_{20}$ extends to a joint 20 from which there extends an arm $b_{24}$ connecting to joint 24 on support 40. Finally, from rotation control point $O_c$, there extends an arm $c_{30}$ which extends to a joint 30 from which there extends a further arm $c_{34}$ to joint 34 on support structure 40. Each of the control inputs $\phi_1$, $\phi_2$ and $\phi_3$ is considered as acting in parallel and controlled by actuators attached to each respective base point $O_a$, $O_b$ and $O_c$. In many respects, and especially depending upon its application, a parallel manipulator structure as schematically illustration in FIG. 3, for example, is preferable to a serial configuration since serial devices are essentially "fishing poles" from a standpoint of their effective rigidity in comparison to a parallel system. In a serial system, the actuators are usually distributed along the length of the serial arm so that the amount of mass to be controlled for a given operation is usually higher than that in a parallel arrangement. Still, both types of systems are currently employed in science and industry and are considered for both present and future applications.

As was mentioned previously, during the discussion of the present state of the art, one of the current shortcomings in robotic manipulator systems is their inadequate level of precision under load. Most arms are accurate to only about 0.050 inches which is inadequate for many precision operations, such as assembly operations and spatial motion functions (e.g. laser cutting operations). Since the precision requirements will continue to intensify and, moreover, the operating environment cannot always be considered to be invariant, a much higher level of precision, which is afforded by the present invention, must be provided.

Figure 4A:
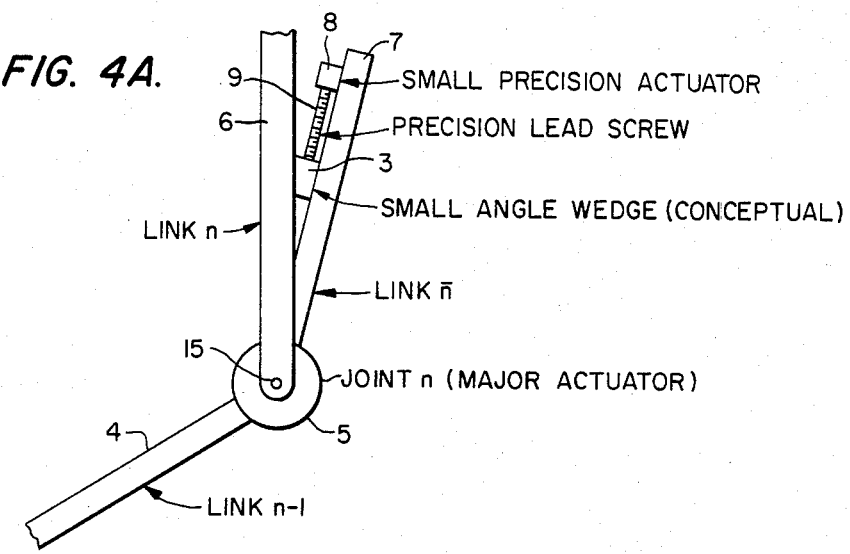
FIG. 4A, is a conceptual mechanical illustration of a control-in-the-small arrangement for a simple serial arm manipulator link.
Figure 4B:
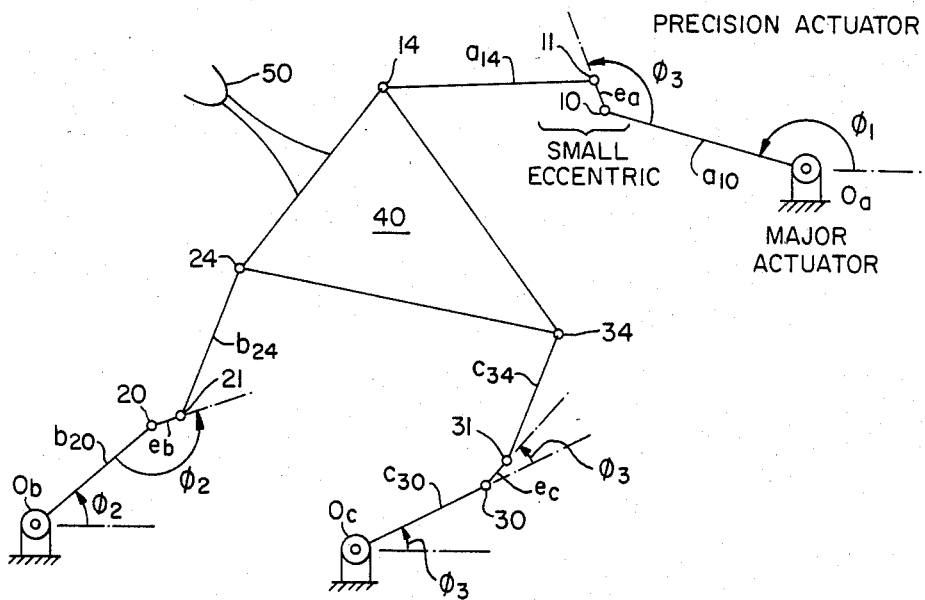
FIG. 4B is a schematic diagram of a planar parallel structure for a robotic manipulator system incorporating an example of the geometry for a control-in-the-small precision actuator system in accordance with the present invention.

FIGS. 4A and 4B show schematic arrangements for incorporation of the control-in-the-small approach for a robotic manipulator in accordance with the present invention for a serial arm structure and a parallel manipulator support structure, respectively.

Referring first to FIG. 4A, wherein a simplified illustration of a serial manipulator structure, for purposes of facilitating an appreciation of the present invention, is shown, there are a pair of links 4 and 6, which constitute successive segments of a serial arm rotationally coupled about a joint axis 15. Each of link arms 4 and 6 is a structural load bearing part of the serial arm structure and the rotation of link 6 relative to arm 4 about pivot axis 15 is controlled by a major actuator (such as a hydraulic or electric motor) 5. As was pointed out previously, precise control of the major actuator 5 to obtain a high resolution placement of link arm 6 relative to link arm 4 is substantially unattainable with current state of the art technology. Pursuant to the present invention, however, a control-in-the-small adjunct precision control manipulator component augments the major actuator and serial arm structure at joint 15.

As shown in FIG. 4A, this additional precision component may include an auxiliary link 7 fixedly attached to which is a small precision actuator 8, such as a small hydraulic or electric drive unit the output of which conceptually drives a small angle wedge 3 via a coupling unit 9 (such as a precision lead screw). In this case, the major actuator 5 drives link 7 relative to link 4 and the control-in-the-small subsystem then drives link 6. The control-in-small auxiliary unit does not bear the load of the serial arm structure, but simply provides precision control to the serial arm structure that cannot be attained by the major actuator and its coupling between links 4 and 6.

It is to be noted that the configuration shown in FIG. 4A is simply for purposes of facilitating and understanding of the present invention, as applied to a serial arm structure. The actual details of a preferred embodiment of the control-in-the-small robotic manipulator according to the present invention will be described below in conjunction with FIGS. 5A-7C.

FIG. 4B shows, in schematic diagram form, the application of the control-in-the-small approach to precision control of a robotic system for a parallel structure manipulator, described briefly above in conjunction with FIG. 3. In the general approach described-above with reference to FIG. 3, the entirety of the control of the positioning of the hand 50 as supported by support structure 40 was obtained through the base pivoting control pivots $O_a$, $O_b$ and $O_c$ at which the three primary control actuators for the parallel system were provided. The precision of the control of the parallel planar structure shown in FIG. 3 is only as good as the control that could be supplied to the primary actuators which, as explained previously is a major shortcoming of current robotic systems. With the application of the present invention to a parallel system as shown in FIG. 4B, substantially non load-bearing precision actuator elements are provided within the connecting arm structure between the major actuators and the control points on the support structure 40 for the end effector manipulated hand 50. Namely, at each of joints 10, 20 and 30 small eccentric units $e_a$, $e_b$ and $e_c$ are provided to interconnect joints 10, 20 and 30, respectively, to additional joints 11, 21 and 31 disposed at one end of each of link arms $a_{14}$, $b_{24}$ and $c_{34}$, respectively. Each eccentric is capable of being rotated about a respective control axis, such as axis 10 for eccentric $e_a$ so that that particular link arm (here eccentric link $e_a$) when rotated through some angle $\phi_1$ effectively alters the length of the dimension from pivot $O_a$ to joint 11. In its physical configuration, the prime mover of the small eccentric connector link is substantially non load-bearing, so that the load for the support structure 40 and hand 50 is borne by arms $a_{10}$ and $a_{14}$, with the eccentric passing the structural forces through it to the load-bearing arms. This adjustment in-the-small is accomplished by linear adjustment of a link dimension. It could also be done by putting angular adjustments-in-the-small at the fixed pivots $O_a$, $O_b$, $O_c$ with similar precision control of the systems output.

Thus, from an overall operational standpoint looking at the schematic support structure shown in FIG. 4B, primary control for the positioning of the robotic manipulator (here hand 50 held by support structure 40) is achieved by a set of major actuators at fixed pivot points $O_a$, $O_b$ and $O_c$. Because the major actuators cannot provide the degree of precision necessary for obtaining the displacement of the hand or end effector 50 within the tolerances required for a significant number of high technology applications, the non-modified manipulator structure suffers serious drawbacks. However, pursuant to the precision actuator augmentation offered by the present invention, the strength and rigidity properties offered by the basic support arm and major manipulator drive units are retained, yet a precision control, which is necessarily lacking without the control-in-the-small improvement by the present invention, is provided. The physical realization of practical embodiments of the control-in-the-small robotic manipulator improvement offered by the present invention will be explained in detail below in conjunction with the description of FIGS. 5A-7C.

Referring now to FIGS. 5A and 5B, there are shown respective side and top views of a control-in-the-small precision actuator for achieving precision angular adjustment about an axial joint, whether the joint be provided in a serial arm structure, a parallel support structure configuration, or a combination of the two. The joint at which the control-in-the-small unit operates has an axis 53 about which load-bearing link arms 51 and 52 rotate relative to each other. Link arm 51 may be considered an input link arm, namely one providing the drive from a principal or main actuator 62, and link arm 52 may be considered an output link arm, which is moved relative to link arm 51 by the main actuator 62. This is more clearly shown in the top view in FIGS. 5B wherein input link arm 51 has a pair of inner shaft support sections 77 and 78 containing respective bearings 82 and 81 rotationally supporting a drive shaft 54. The drive shaft 54 is driven by a primary actuator drive unit 62 (such as a hydraulic or electric motor) that is affixed to the inner shaft support section 77 of input link arm 51 by way of suitable bolts 74 and 75 as shown. Drive shaft 54 is coupled to outer shaft support sections 71 and 72 of output link arm 52 and is rotationally supported thereat by way of bearings 83 and 84. For transmitting the rotational torque from the primary actuator drive unit 62, that is fixedly supported within the inner shaft support sections 77 and 78 of the input link arm 51, to the output link arm 52, a rotary sector gear 61 is rigidly attached to the drive shaft 54 as by way of a half moon key 55 (or other appropriate means).

Located within the output link arm 52 is a secondary actuator comprised of a precision controlled drive unit 101 having an output shaft 96 for rotationally driving worm gear 92. Shaft 96 is supported by bearings 94 and 95 within the output link arm 52. The worm gear 92 meshes with the teeth 98 of the gear sector 61 so as to provide a mechanical coupling between the prime drive shaft 54, that is driven by the primary actuator 62 within the input link arm 51, and the output link arm 52.

As shown in FIG. 5A, the primary control angle $\theta$ constitutes that angle through which the output shaft 54 is driven by the primary actuator 62 that is supported by the input link arm 51. Because the primary actuator is part of the load-bearing structure and operates over a substantially wide range of rotational displacement values, its output provides essentially a coarse positioning of output link arm 52 relative to input link arm 51. However, augmenting and providing precision control for the total control angle that is sought by the operation of the principal actuator 62 is the secondary actuator 101, thereby providing the control-in-the-small system of the present invention which supplies an angular displacement control over a small control angle $\theta$ through which the gear sector 61 may be driven by rotation of the worm gear 92 under the control of the precision small actuator 101. As a practical parametric range, $\theta$ may fall within a range of ±5°, while the primary rotation angle $\theta$ may range from 0° to ±90° as typical values. The secondary precision control system is essentially non load-bearing and operates over a much narrower and more accurate range of control values so that the effect of both the secondary and primary positioning systems is to achieve the above-defined "control-in-the-small" precision control of the angular positioning of output link arm 52 relative to input link arm 51. In other words the primary actuator 62, whose control commands can be up-dated at only a relatively low sampling rate and is capable or resisting large loads through relatively wide range of rotation over which it operates, but cannot simultaneously satisfy high resolution requirements, is augmented by a high resolution and non load-bearing secondary actuator 101 whose control commands can be rapidly up-dated. The primary reason for the higher sampling rates for the small control subsystem is that the manipulator geometry changes slowly by comparison and linear control theory applies to the control-in-the-small subsystem. This dual action of primary actuator 62 and secondary actuator 101 provides control in both the large motion range and small motion range, so as to attain a "control-in-the-small" precision robotic manipulator system.

FIGS. 6A and 6B show respective side and top views of a control-in-the-small precision actuator for achieving precision linear adjustment in accordance with the present invention, which incorporates an eccentric element that is driven by a secondary precision non load-bearing actuator for controllably adjusting the effective length of a support arm combination.

The manipulator arm structure may include a pair of principal load bearing links 110 and 112 interconnected by a third link 11. One end of link 111 is coupled with a shaft 131 which rotates about an axis 113 and is supported by bearings 120 and 121 in one end of link 110. Bearings 120 and 121 are provided in outer shaft support sections 127 and 128 which receive the bearings and the shaft 131 and surround the sides of link 111. Link 111 is essentially fork-shaped, as shown in FIG. 6B and contains bearings 123 and 124 for receiving rotational segments 135 and 137 of an eccentric member. Each of rotational components 135 and 137 has an axis of rotation 115 that is concentric with the axis of the drive output of a secondary drive unit 151 that is mounted, as by way of bolts 141 and 142, onto an outer shaft support fork portion 141 of link 111. Each of elements 135 and 137 has a circular cross-section with axis 114 passing through the center of each circle. These components are joined by way of land portions 132 and 134 to an offset shaft portion 133 disposed within bearing 125 of output link 112. There is thus formed a unitary eccentric rotational combination of shaft component 135-land portion 134-offset shaft component 133-land joining portion 132-shaft 137, driven by secondary actuator 151. The axis 115 of shaft portion 133 is offset from the axis 114 driven by secondary drive unit 151 that is coaxial with the axes of shaft portions 135 and 137. The distance AB between axis 113 and axis 114 of connecting link 111 is fixed. However, because of the eccentric displacement of shaft portion 133 by virtue of offset connecting lands 132 and 134, the distance AB' between axis 113 and axis 115 is variable. This means that the effective length of the combination of connecting link 111 and output link arm 112 may be incrementally adjusted by drive unit 151.

As pointed out previously in conjunction with the description of the schematic illustration of the parallel system shown in FIG. 4B, through the precise rotation of a small eccentric piece, here link 111 which rotationally supports eccentric shaft components 133, a control-in-the-small adjustment of the effective length of a main support arm which connects a major actuator with a manipulator support structure is achieved without imposing substantial load-bearing requirements onto the precision control element, in this case the prime mover 151.

Figure 7A:
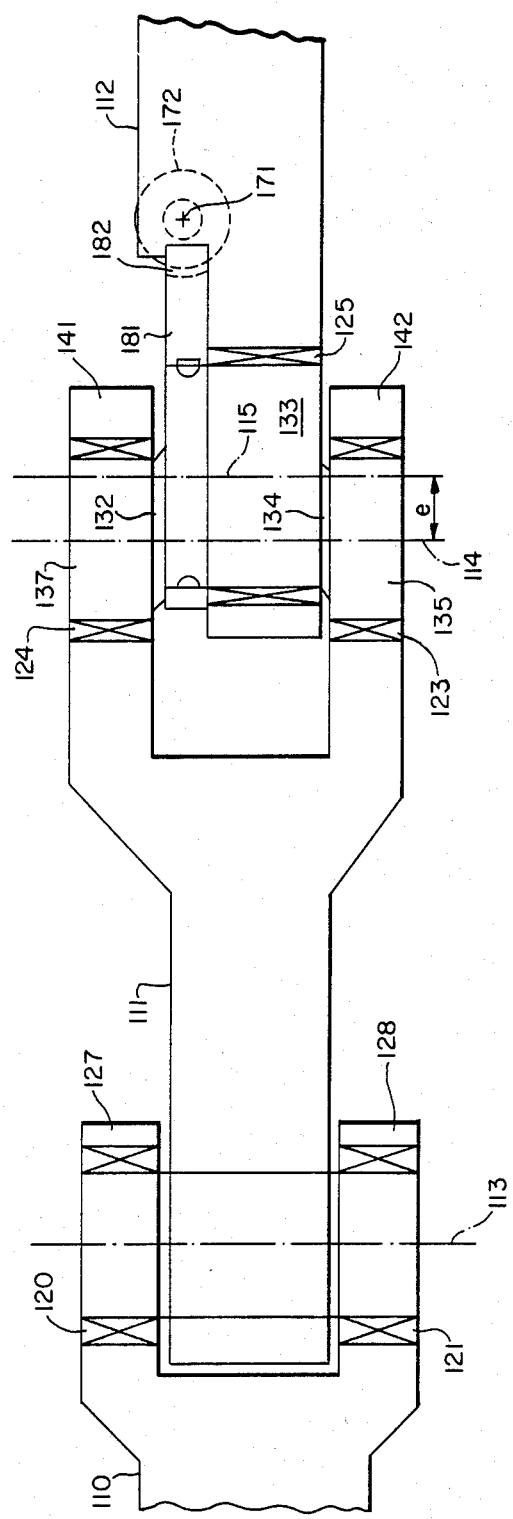
FIGS. 7A and 7B are top views of respective asymmetric and symmetric configurations of the control-in-the-small precision actuator embodiment shown in FIGS. 6A and 6B where a worm gear drive is used between the prime mover and the eccentric.
Figure 7B:
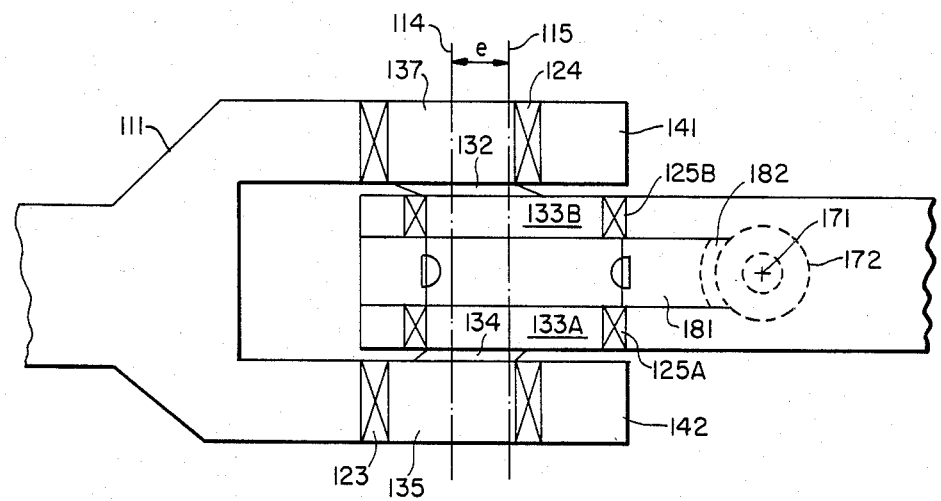

FIGS. 7A and 7B show respective asymmetric and symmetric partial top views of a control-in-the-small robotic manipulator for linear adjustment modified with respect to that shown in FIG. 6B. Specifically, in place of the eccentric shaft configuration coupled with the secondary drive unit in the manner shown in FIG. 6B, a sector gear element 181, similar to sector gear 61 shown in the embodiment illustrated in FIGS. 5A and 5B, is formed unitarily with the eccentric shaft components, with the sector gear 181 being driven by a worm gear drive unit 172 disposed in the output link 112.

As shown in FIG. 7A, the sector gear 181 is connected to land portion 132 and to interior shaft eccentric component 133. The sector gear teeth 182 mesh with the worm gear drive 183 of worm gear unit 172, which rotates the worm gear drive about axis 171 is disposed orthogonal to the longitudinal axis of output arm 112.

Similarly, in the symmetric configuration shown in FIG. 7B, the sector gear 181 is disposed centrally of a pair of eccentric shaft components 133A and 133B and is mounted unitarily therewith for rotation about axis 115. Each of eccentric shaft components 133A and 133B is supported for rotation input link 112 by bearings 125A and 125B, respectively.

Figure 7C:
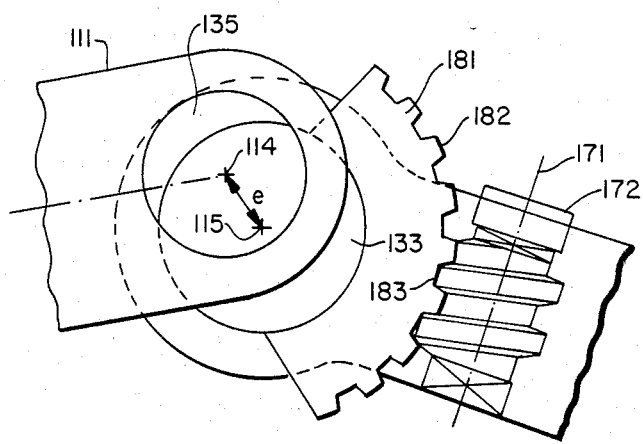
FIG. 7C is a partial side view of the gearing arrangement of the asymmetric configuration of the control-in-the-small precision linear adjustment actuator shown in FIG. 7A.

FIG. 7C shows a side view of a portion of the detailed configuration of FIG. 7A wherein the relative offset between axes 114 and 115 is shown, axis 115 being concentric with the axis of rotation of the sector gear 181. Advantageously, the configuration shown in FIGS. 7A–7C, which may be employed for linear control-in-the-small robotic manipulators, permits the size of the control-in-the-small components, specifically the worm gear drive and sector gear coupling units, to be very compactly arranged, since very small torques on the prime movers are involved in achieving the desired precision adjustment.

As pointed out previously, and as will be clear from the foregoing detailed explanation of exemplary preferred embodiments of the present invention, the control-in-the-small robotic manipulator system in accordance with the present invention offers a significant improvement over the state of the art robotic manipulators systems. The necessary high load support capacity of the primary motion and link support system are retained by the present invention; however, rather than attempt to impart precise control for positioning the end effector by way of the primary manipulator drive unit, the present invention offers a precision auxiliary and reduced size control unit which is substantially non load-bearing and may be effectively non visible in its installed configuration. Moreover from a real time analysis standpoint, the secondary drive subsystem configuration of the present invention has no substantial influence on the kinematic control of the primary input or drive so that it is effectively dynamically decoupled from the prime manipulator drive system. It is only necessary that it pass or couple the forces and torques within the subsystem unit in which it is installed to the next unit or arm that is coupled to the arm retaining the control in the small drive unit. Since the increments of displacement (linear displacement of angular displacement) imparted by the secondary drive unit are small (i.e., about 1% of the full scale range), relative to the major or large displacements achieved by the principal support arms, smaller components, which enjoy reduced inertia and deformation problems, may be employed. This means that the signal sampling rate for the precision control components may be significantly increased (by orders of magnitude) relative to that of the major or primary arm positioning system. As a result, a much more precise adjustment of the resulting locating of the end effector of the robot may be obtained.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed:

1. An arrangement for controlling the position of an end-effector supported by a robotic load-bearing link arrangement comprising:

primary link displacement actuator means, coupled with and effectively participating in the load-bearing action of said link arrangement, for effecting a coarse positioning of said end effector in accordance with a first control command supplied thereto; and secondary link displacement actuator means, coupled with but effectively not-participating in the load-bearing action of said link arrangement, for effecting a precise positioning of said end-effector in accordance with a second control command supplied thereto;

whereby the degree of precision to which the position of said end-effector may be controlled is effectively independent of the load-bearing action of said link arrangement.

2. An arrangement according to claim 1, wherein the degree of displacement of said end-effector capable of being carried out by the operation of said primary link-displacement actuator means is substantially greater than that capable of being carried out by the operation of said secondary link-displacement actuator means.

3. An arrangement according to claim 1, wherein the rate at which said first control command is updated for controlling the operation of said primary link-displacement actuator means is less than the rate at which said second control command is updated for controlling the operation of said secondary link-displacement actuator means.

4. An arrangement according to claim 1, wherein said secondary link-displacement actuator means provides linearized control of the precise positioning of said end-effector.

5. An arrangement according to claim 1, wherein said secondary link-displacement actuator means includes means for providing an increment of displacement of said end-effector which is small compared with the increment of displacement of said end-effector which is provided by said primary link-displacement actuator means.

6. An arrangement according to claim 1, wherein said secondary link-displacement actuator means comprises means for adjusting the effective length of one of said links relative to its connection to another of said links.

7. An arrangement according to claim 1, wherein said secondary link-displacement actuator means comprises means for adjusting the rotational position of one of said links around an axis about which said one of said links may rotate relative to another of said links.

8. An arrangement according to claim 7, wherein said primary link-displacement actuator means includes a primary actuator drive unit coupled with said another of said links and having an output shaft driven thereby in response to a control command signal applied thereto, said output shaft coupling said one of said links to said another of said links for rotation about the axis of said output shaft.

9. An arrangement according to claim 8, wherein said secondary link-displacement actuator means comprises a first coupling member affixed to said output shaft and a controllable second coupling member supported by said one of said links and cooperating with said first coupling member, whereby controllable adjustment of said second coupling member precisely defines the angular position of said one link about said axis relative to said another link.

10. An arrangement according to claim 9, wherein said controllable second coupling member comprises a worm gear drive mechanism supported by said one of said links for rotation about an axis orthogonal to the longitudinal axis of said one link, and wherein said first coupling member comprises a sector gear affixed to said output shaft, the teeth of said sector gear engaging the rotational drive surface of said worm gear drove mechanism.

11. An arrangement according to claim 6, wherein said secondary link-displacement actuator means comprises a first link one end of which is coupled to said another of said links and the other end of which is provided with a rotatable eccentric coupling element adapted for rotation about a first axis, and means for coupling said one link to said eccentric coupling element whereby said one link is rotatable about a second axis offset from said first axis.

12. An arrangement according to claim 11, wherein said secondary link-displacement actuator means comprises means for rotatably coupling said one end of said first link about a third axis at the connection of said first link to said another link.

13. An arrangement according to claim 11, wherein said secondary link-displacement actuator means further comprises a first coupling member affixed to said eccentric coupling element and a controllable second coupling member supported by said one of said links and cooperating with said first coupling member, whereby controllable adjustment of said second coupling member precisely defines the angular position of said eccentric element and thereby said second axis about said first axis.

14. An arrangement according to claim 13, wherein said controllable second coupling member comprises a worm gear drive mechanism supported by said one of said links for rotation about an axis orthogonal to the longitudinal axis of said one link, and wherein said first coupling member comprises a sector gear affixed to eccentric coupling element, the teeth of said sector gear engaging the rotational drive surface of said worm gear drive mechanism.

15. An arrangement according to claim 13, wherein said first and second coupling members and said eccentric element are disposed symmetrically relative to a longitudinal axis of said one of said links.

16. A method of precisely controlling the position of an end-effector supported by a robotic load-bearing manipulator link arrangement comprising the steps of:

(a) effecting a primary, coarse positioning of said end-effector through the operation of a primary link-displacement actuator which effectively participates in the bearing of the load by said link arrangement; and (b) effecting a secondary, precise positioning of said end-effector through the operation of a secondary link-displacement actuator which does not effectively participate in the bearing of the load by said link arrangement;

whereby the degree of precision to which position of said end-effector may be controlled is effectively independent of the load bearing action of said link arrangement.

17. A method according to claim 16, wherein the degree of displacement of said end-effector capable of being carried out by the operation of said primary link-displacement actuator is substantially greater than that capable of being carried out by the operation of said secondary link-displacement actuator.

18. A method according to claim 16, wherein step (a) includes providing first control command signals for the operation of said primary link-displacement actuator at a first control processing rate and step (b) includes providing second control command signals for the operation of said secondary link-displacement actuator at a second control processing rate higher than that for said first control command signals.

19. A method according to claim 16, wherein step (b) includes the step of carrying out precise positioning of said end-effector through linearized control of the operation of said secondary link-displacement actuator.

20. A method according to claim 16, wherein an increment of displacement of end-effector by the operation of said secondary, non-loading bearing link-displacement actuator in accordance with step (b) is small compared to an increment of displacement of said end-effector by the operation of said primary, load-bearing link displacement actuator in accordance with step (a).

21. A method according to claim 16, wherein step (b) comprises controlling said secondary link-displacement actuator so as to adjust the effective length of one of said links relative to its connection to another of said links.

22. A method according to claim 16, wherein step (b) comprises controlling said secondary link-displacement actuator so as to adjust the rotational position of one of said links around an axis about which said one of said links may rotate relative to another of said links.

* * * * *